United States Patent [19]

Gillespie

[11] 4,106,776
[45] Aug. 15, 1978

[54] FLUIDICALLY SUPPORTED AND FLUIDICALLY DRIVEN TURNTABLE

[76] Inventor: David M. Gillespie, 451 E. Fourteen Mile Rd., Birmingham, Mich. 48009

[21] Appl. No.: 791,275

[22] Filed: Apr. 27, 1977

[51] Int. Cl.² .............................................. G11B 3/60
[52] U.S. Cl. ................................................ 274/39 R
[58] Field of Search ............... 274/39 R, 39 A, 1 E, 274/1 R; 192/58 A, 12 B

[56] References Cited

U.S. PATENT DOCUMENTS

| 2,237,907 | 4/1941 | Landis | 274/39 A |
| 2,342,414 | 2/1944 | Magill | 192/58 A |
| 3,103,364 | 9/1963 | Macks et al. | 274/39 R |
| 3,319,965 | 5/1967 | Wolf | 274/39 A |

*Primary Examiner*—Harry N. Haroian
*Attorney, Agent, or Firm*—Charles P. Padgett, Jr.; Charles R. Rutherford

[57] ABSTRACT

A method and apparatus for rotatably supporting and driving phonograph records, memory disks or the like while substantially reducing if not eliminating the undesirable effects of mechanical vibrations and drive speed fluctuations. A support frame houses a tank which holds a quantity of liquid such as a mixture of silicon oil and water. A first generally circular member having a plurality of spaced vanes thereon is mounted within the tank adjacent the bottom thereof so that it can be positively rotatably driven from a drive mechanism external to the tank. A second generally circular member having a plurality of spaced vanes thereon is positioned vertically above the first member so that it is supported solely upon the liquid and so that it is free to rotate with respect thereto without any mechanical interconnection to the first member. At least a portion of the vanes of the second member extend downwardly into the liquid but remain vertically spaced apart from the vanes of the first member. When the first member is positively driven, it causes the liquid to circulate within the tank. The rotatively circulating liquid acts as a fluid coupling to rotatably drive the second member as well. The nature of the fluid coupling, the absence of any direct mechanical linkage between the members, and the flywheel effect achieved by the apparatus of the present invention substantially reduce if not eliminate the undesirable effects normally attributable to mechanical vibrations and drive speed fluctuations.

30 Claims, 9 Drawing Figures

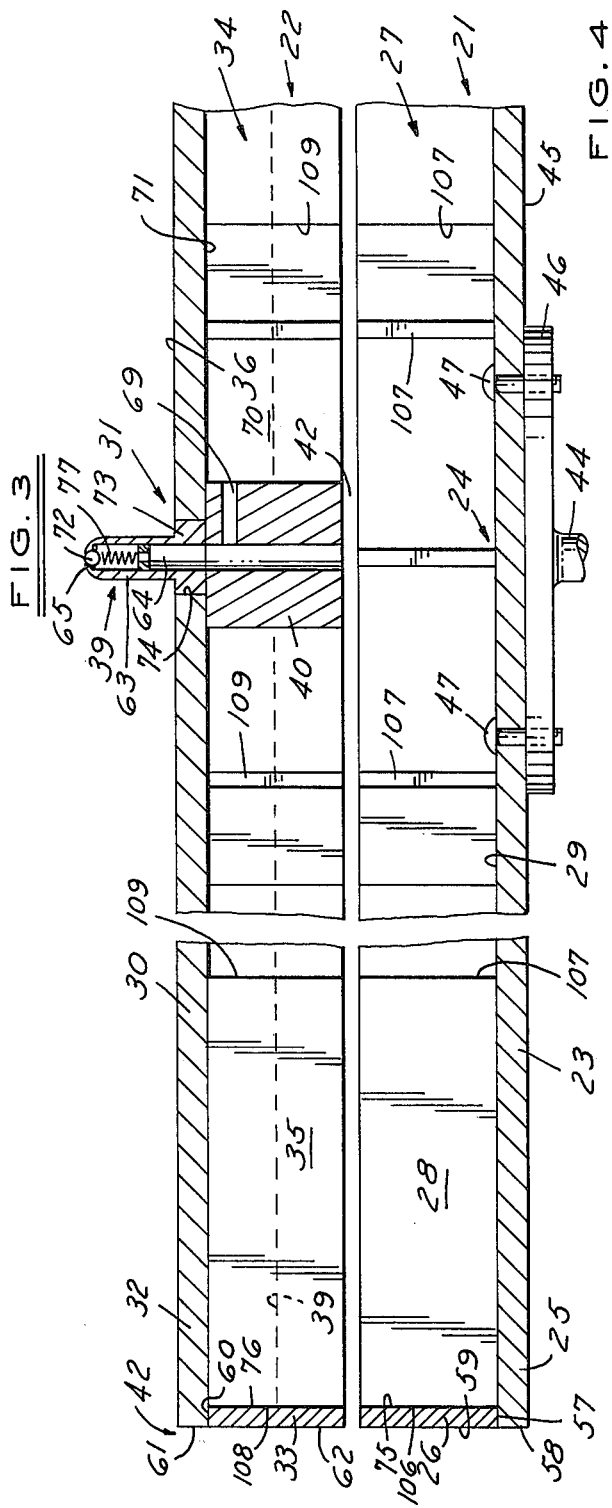
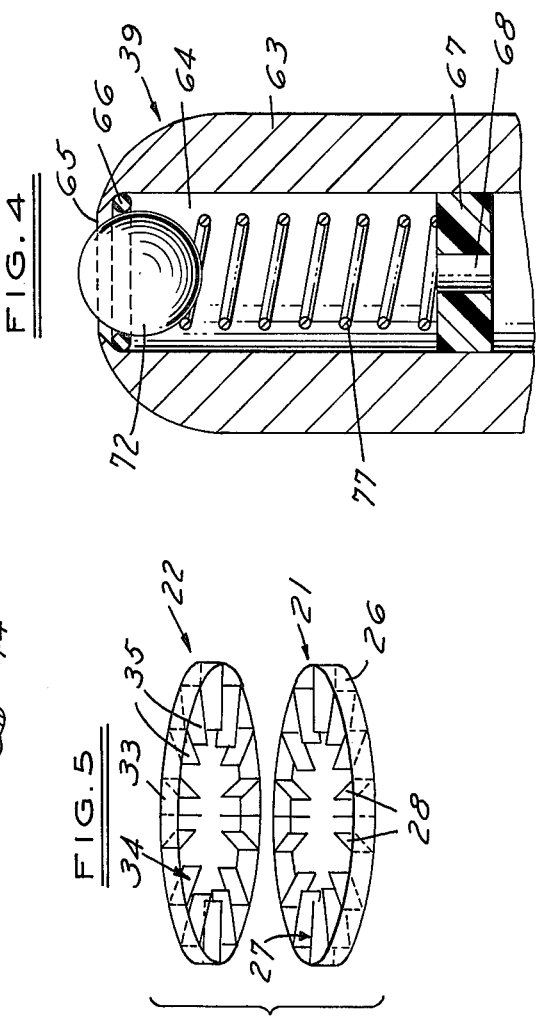

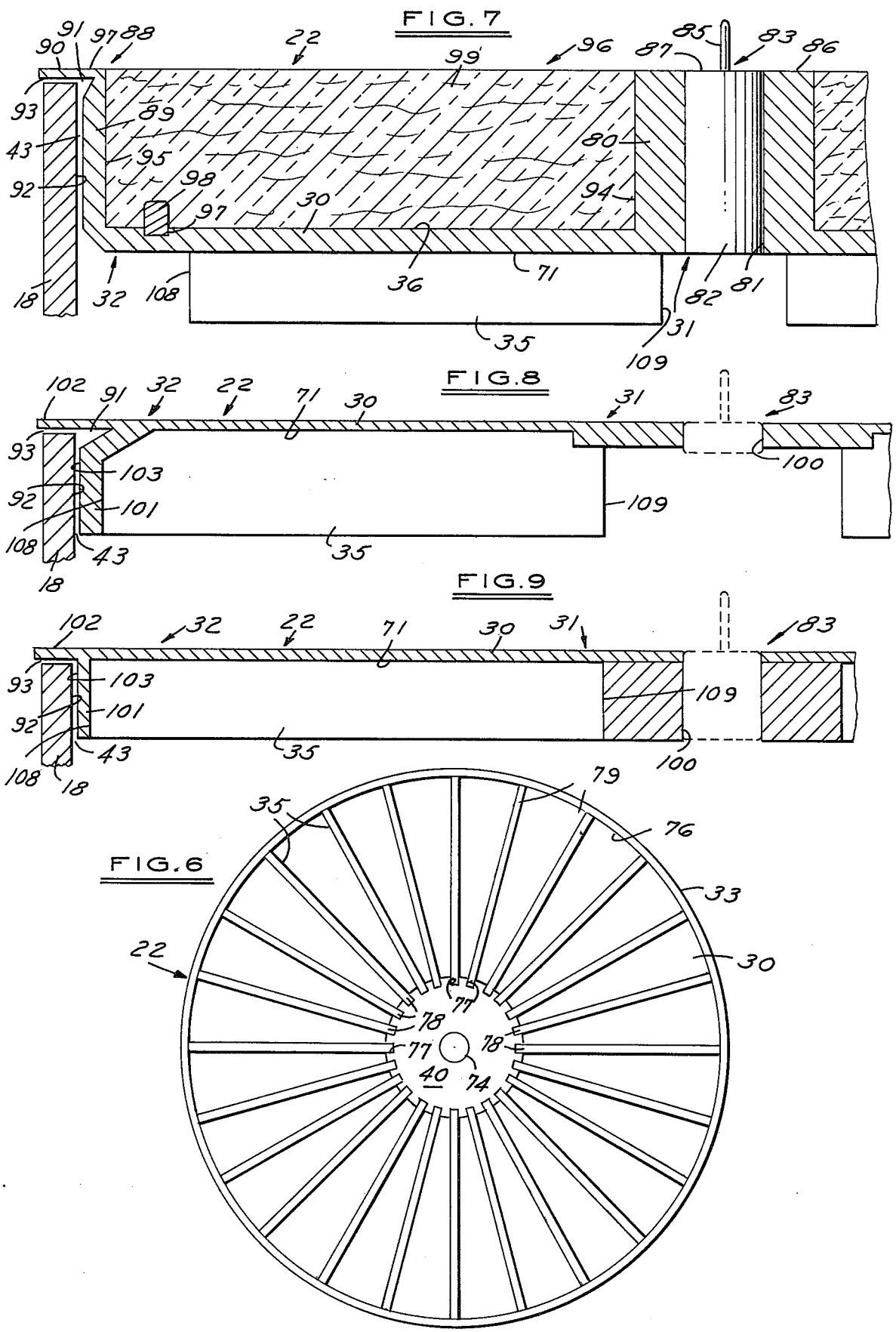

FLUIDICALLY SUPPORTED AND FLUIDICALLY DRIVEN TURNTABLE

BACKGROUND OF THE INVENTION

1. Field of the Invention

This invention relates generally to phonograph equipment and more particularly to a fluidically supported and fluidically driven turntable for drivably supporting phonograph records, memory disks, or the like.

2. Description of the Prior Art

Conventional turntables are normally supported on a base via a spring-mounting arrangement. The use of such spring-mounting arrangements serves to protect the turntable from shock and vibration external to the instrument, but make no correction for internal mechanical vibrations and rumble and provide no means for compensating for variations in drive speed.

U.S. Pat. Nos. 3,103,364 and 3,674,278 teach phonograph systems wherein the turntable is supported at least partially on a film of air to help isolate the turntable from vibration and mechanical noise. The use of an air bearing provides only a very limited type of vibration isolation and provides no means for compensating for variations in drive speed.

U.S. Pat. Nos. 1,747,866; 1,817,758; and 2,113,390 teach prior art phonograph apparatus wherein the turntable employs some type of flywheel arrangement to compensate for fluctuations in drive speed. Friction is reduced and/or damping action is achieved by the use is a viscous medium such as oil which may also serve a lubricating function.

U.S. Pat. Nos. 1,778,756 and 2,237,907 teach phonograph apparatus employing a fluid coupling between the drive member and the member carrying the turntable platter, but both patents still involve some type of coupling or bearings constituting a mechanical interconnection between the members, thereby reducing the ability effectiveness of the system to truly isolate the turntable from vibration, rumble and noise caused by the drive means.

U.S. Pat. Nos. 2,221,705; 2,342,414; and 2,557,799 relate generally to fluid couplings but each involves some type of bearing or mechanical interconnection between the driven member and the housing or between the driven member and the drive member thereby increasing the tendency of the system to transmit mechanical vibration and noise.

My co-pending patent application U.S. Ser. No. 721,626 which was filed on Sept. 8, 1976, now U.S. Pat. No. 4,071,252, which issued on Jan. 31, 1978, discloses a FLUIDICALLY DRIVEN TURNTABLE for reducing the undesireable effects of mechanical vibrations and drive speed fluctuations and is incorporated by reference herein. The present invention is a further improvement thereover and further reduces those undesireable effects.

None of these patents teach a true fluid coupling whereby the turntable is totally isolated from the drive means so as to eliminate or at least substantially reduce the undesirable effects resulting from mechanical vibration produced in the bearings and the like. Furthermore, none of these patents teach accomplishing the flywheel effect to compensate for drive speed fluctuation by drivably rotating or circulating a quantity fo liquid within a tank such that the liquid itself drives the actual turntable and forms a part of the flywheel therewith.

Yet further, none of these patents teach or even remotely suggest such a fluid coupling wherein the turntable itself is totally supported as well as driven by the fluid so that no mechanical linkage or bearing exists between the driven turntable and the drive member thereby greatly enhancing the ability of this system to eliminate or at least substantially reduce vibration, rumble and noise.

Many of the approaches taught by the prior art involve a deterioration in performance as the parts wear. Most of the prior art systems cannot insure that the turntable is driven with an absolutely constant speed due to motor wear, deterioration of the motor bearings, variations in line voltage, and the like. The mechanical coupling means employed by the systems of the prior art and the springs used to isolate the turntable from vibration and shock meet with only limited or partial success and none is truly capable of isolating the turntable from internal vibration, oscillation and rumble generated within the unit itself.

The present invention provides a turntable which is totally supported by a fluid medium and driven thereby so that the turntable is actually physically isolated from the drive member without any mechanical interconnections, bearings or the like thereby overcoming the disadvantages of the prior art and permitting a vastly more accurate and faithful reproduction of the sounds or information recorded on the phonograph records, memory disks or the like.

BRIEF SUMMARY OF THE INVENTION

The fluidically supported and fluidically driven turntable assembly of the present invention employs a tank and a generally symmetrical disk-like member disposed at least partially within the tank for rotating therein in a generally horizontal plane. The lower side of the symmetrical member includes a plurality of spaced vane elements and the upper side is adapted to carry the phonograph records, memory disks or the like thereon for rotation therewith.

A liquid is disposed within the tank in sufficient quantity to at least partially immerse the vane elements of the symmetrical member. The liquid is operable to rotatably support the member without the need for any type of mechanical connection between the member and any external elements. Means are provided for positively rotatively circulating the liquid so that the liquid itself drives the symmetrical member and the phonograph record, memory disk or the like carried thereon while simultaneously isolating the phonograph record, memory disk or the like from mechanical vibration, noise and rumble inherent in the means for positively rotatively circulating the liquid.

The generally symmetrical disk-like member may include a rim portion disposed adjacent to the radially outer periphery thereof and being generally perpendicular to the plane of the symmetrical member. A space may be provided adjacent the radially outer surface of the rim portion and adjacent the sides of the tank to provide a fluid bearing for automatically centering the symmetrical member when it is operatively rotated by the circulating liquid.

Furthermore, the turntable assembly of the present invention may be provided with means for selectively decreasing and/or increasing the vertical height of the symmetrical member within the tank to compensate for variations in the thickness of the phonograph records, memory disks and the like.

In one embodiment of the fluidically supported and fluidically driven turntable apparatus of the present invention, the symmetrical member assumes a dish-shaped configuration having a raised annular rim portion and a raised central hub portion for defining an annular depression circumferentially about the member. The turntable platter is supported upon an upper end portion of the central hub and upon the upper end portion of the rim. The annular depression may be provided with a groove formation adapted for housably receiving counterweights for increasing the balance and stability of the symmetrical member and increasing the flywheel effect thereof to aid in damping out drive speed fluctuations. Furthermore, the annular depression may be filled with a sound-absorbing foam to further isolate the turntable platter from inherent sources of vibration, noise and rumble thereby further increasing the quality of the system.

The fluidically supported and fluidically driven turntable assembly of the present invention teaches various configurations of a turntable platter support member which is both supported upon and driven by a quantity of liquid disposed within a tank. Since there is no mechanical linkage or physical bearing assembly connecting the turntable support member with the tank or with the means for rotatively circulating the fluid within the tank, the record support member is truly physically isolated from the internal vibration, noise and rumble normally associated with the drive means of the system. Therefore, actual mechanical contact between the turntable support member and the drive means is eliminated or at least minimized since the turntable support member is totally floated upon the liquid once it is set in motion. The true fluid coupling existing between the drive means and the turntable support member provides a true static fluid which will produce constant speed and torque once it is set in continuous motion.

The fluid coupling isolates the second member from "flutter" which is caused basically by imperfections in the mechanical drive systems conventionally used; it isolates the turntable support member from "wow" which is produced from imperfections in the drive system and in the drive motors of most turntables; and it isolates the turntable support member from "rumble" or vibration which is caused by the sensitive cartridge of the turntable picking up any mechanical vibration or frequency of any moving part physically connected to the turntable platter itself. The liquid coupling employed to both support and to drive the member in the present invention eliminates or at least minimizes all of these problems thereby greatly increasing the quality of the system.

Furthermore, the present invention eliminates or at least substantially reduces the undesirable effects resulting from variations or fluctuations in drive speed which are inherent in most of the systems of the prior art. These fluctuations are eliminated or damped out due to the flywheel effect achieved by the rotatably circulating volume of liquid together with the rotating members. Furthermore, the flywheel effect achieved by the present invention may be enhanced by the addition of counterweights to the symmetrical element, if desired.

The fluidically supported and fluidically driven turntable assembly of the present invention provides a much higher quality of sound reproduction than was heretofore achievable in the prior art. The system is relatively inexpensive, is extremely wear-resistant, and is not difficult to transport since the liquid may be added after the system is installed at its desired location and subsequently removed if further transportation is required.

Other advantages and meritorious features of the present invention will be more fully understood from the following description of the drawings and preferred embodiments, the appended claims and the drawings which are briefly described hereinbelow.

BRIEF DESCRIPTION OF THE DRAWINGS

FIG. 3 is a blown-up sectional view, partially broken away, of a portion of the turntable apparatus of FIG. 2 illustrating one configuration of the turntable platter support member of the present invention together with a means for compensating for record thickness;

FIG. 4 is a blown-up sectional view showing one means for selectively adjusting the height of the turntable support member within the tank to compensate for variations in the thickness of the phonograph record;

FIG. 5 is a partially exploded perspective view of one embodiment of the first and second generally circular members of FIG. 2;

FIG. 6 is a top plan view of another embodiment of the turntable platter support member of the present invention and the vane configuration thereof;

FIG. 7 is a sectional view, partially broken away, of a portion of the turntable assembly of the present invention illustrating another embodiment of the turntable platter support member of the invention;

FIG. 8 is a sectional view, partially broken away, of a portion of the turntable assembly of the present invention illustrating another embodiment of the turntable platter support member of the present invention; and FIG. 9 is a sectional view, partially broken away, of a portion of the turntable assembly of the present invention illustrating still another embodiment of the turntable platter support member of the present invention.

DESCRIPTION OF THE PREFERRED EMBODIMENT

Figure 1:
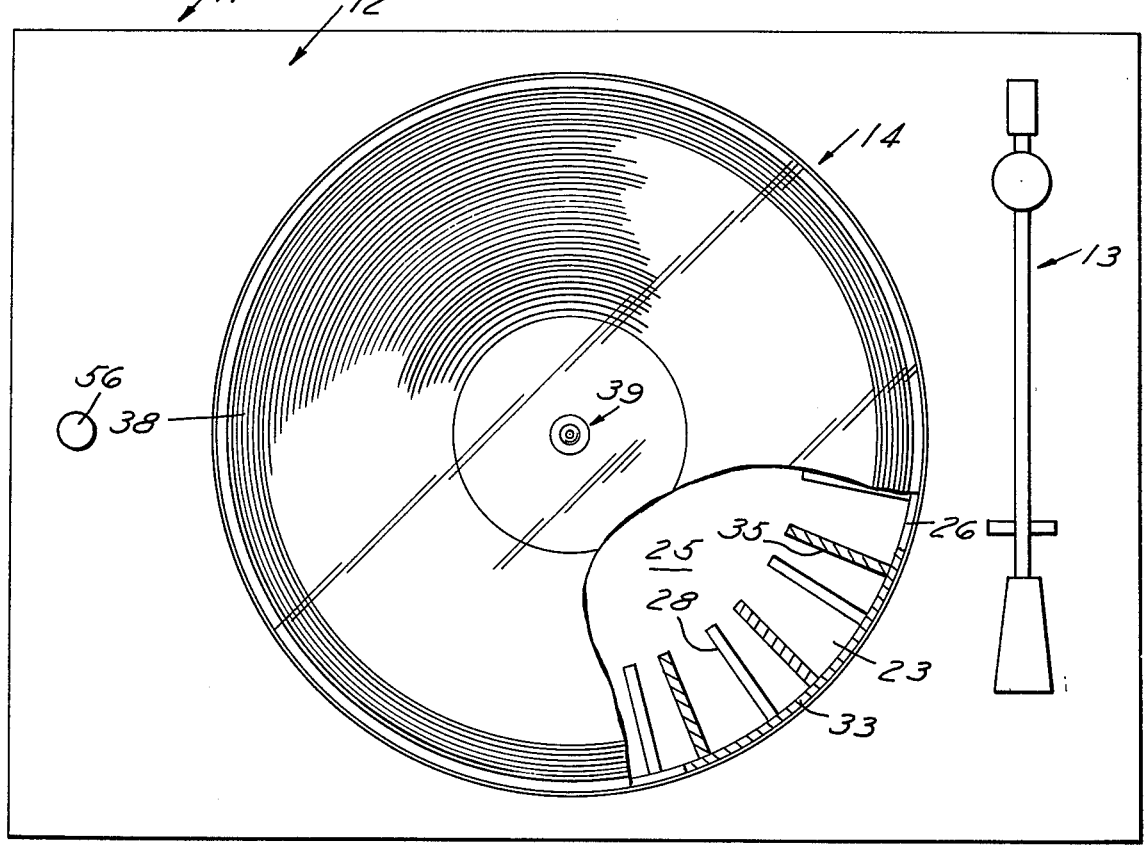
FIG. 1 is a top plan view, partially broken away, of a phonograph system employing the turntable assembly of the present invention.

Referring now to the drawings and to FIGS. 1 and 2 in particular, the phonograph apparatus 11 used to describe the preferred embodiment of the present invention will be discussed. The phonograph apparatus 11 includes a turntable support or frame 12 and a conventional tone arm assembly 13. The phonograph assembly 11 further includes a turntable assembly 14 and a drive means 15 therefore.

The turntable support or frame 12 includes a generally cylindrical central tank portion 16 having a tank bottom 17 and cylindrical tank-defining sidewalls 18. The frame 12 also includes a base portion 19 and a hollow base cavity 20 between the base portion 19 and the bottom 17 of the tank 16 for housing the drive assembly 15.

Disposed within the tank 16 is a first generally circular member 21 which is mounted centrally within the tank 16 and adjacent to but spaced vertically above the tank bottom 17. A second generally circular member or turntable platter support member 22 is disposed within the tank 16 vertically above the first circular member 21 so that each is free to rotate with respect to the other about an axis of rotation 41 as hereinafter described.

The lower or first generally circular member 21 includes a generally flat circular disk 23 having a central hub portion 24. The outer peripheral portion 25 of the disk 23 terminates in a generally cylindrical lip portion 26 which extends vertically upward therefrom. A plurality of generally radially disposed vanes 27 extend from the central hub portion 24 radially outward along various radii of the disk 23 to abutt the lip 26. Each of the plurality of vanes 27 includes a generally flat rectangular blade 28 having its lower longitudinal edge portion secured to the upper surface 29 of the disk 23 such that its upper longitudinal edge portion is spaced vertically above the surface 29 of the disk 23 and such that the plane defined by each of the blades 28 is substantially perpendicular to the plane of the surface 29 of the disk 23.

The second or upper symmetrical member 22 includes a generally flat circular disk 30 having a central hub portion 31. The radially outer portion 32 of the disk 30 terminates in a generally cylindrical lip portion 33 which is vertically disposed downwardly from the lower surface 71 of the disk 30.

A plurality of generally radially disposed vanes 34 are circumferentially spaced about the surface 71 of the disk 30 and extend from the central hub portion 31 radially outwardly along various radii of the disk 30 to abutt the lip portion 33. Each of the plurality of vanes 34 includes a generally flat rectangular blade 35 having its upper longitudinal edge secured to the surface 71 of the disk 30 so as to space its opposite longitudinal edge vertically below the surface 71 and facing but spaced apart from the upper longitudinal edge portion of the blades 28 of the first circular member 21.

The upper surface 36 of the disk 30 supportively carries a conventional turntable platter 37 such as a felt pad or the like. A conventional phonograph record 38 is supportively carried upon the turntable platter 37 for rotation therewith. The disk 30 supportively mounts a vertically disposed spindle assembly 39 which is secured to the central hub portion 31 of the disk 30 for engaging the central alignment apertures of conventional phonograph records 38.

Figure 2:
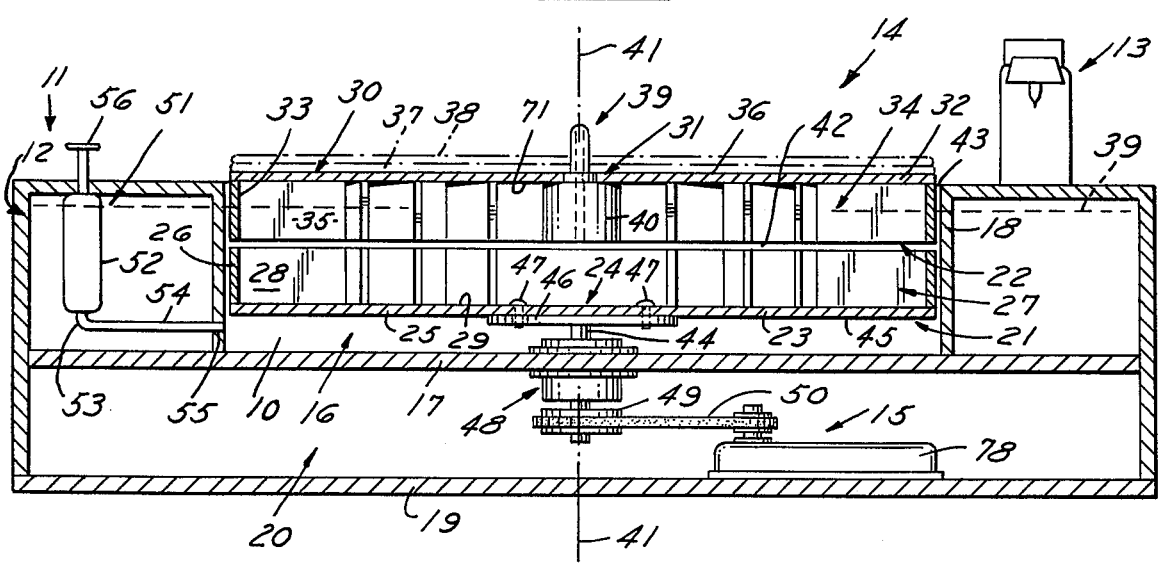
FIG. 2 is a front sectional view of the phonograph apparatus of FIG. 1.

As shown in FIGS. 2 and 3, the tank 16 is filled with a quantity of liquid 10 to a level 39 which is sufficient to totally immerse the lower symmetrical member 21 and to at least partially immerse the downwardly extending portion of the vane elements 35 of the upper symmetrical member 22. The opposite side 71 of the central hub portion 31 of the disk 30 includes an annular collar 40 disposed concentric to the axis 41 of the disk 30. The annular collar 40 has its upper edge portion integral with or secured to the lower surface 71 of the disk 30 so that the collar 40 is downwardly disposed generally perpendicular to the lower surface 71 of the disk 30 and concentrically around the axis 41.

In the turntable assembly 11 of the present invention, there is no mechanical interconnection or bearing connecting the upper symmetrical member 22 to the lower symmetrical member 21 or to the tank 16 or frame 12 of the assembly 11. As indicated in FIGS. 2 and 3, a predetermined fluid-filled gap or spacing separation 42 exists between the downwardly extending vanes 35 of the upper symmetrical member 22 and the upwardly extending vanes 28 of the lower symmetrical member 21. Similarly, there is a second gap or predetermined spacing 43 existing between the walls 18 of the tank 16 and the radially outer surface of the rim portions 26, 33 of the members 21, 22 respectively. The gap 43 fills with the fluid 10 housed within the tank 16 during operation to provide a fluid bearing between the radially outer surface of the rim portion 33 of the upper member 22 and the inside surface of the walls 18 of the tank 16 which automatically centers the floating upper member 22 as it is operatively rotated.

The lower or driven circular member 21 has a drive shaft 44 secured to the lower surface 45 thereof at the central portion 24 so that the shaft 44 is coincident with the axis of rotation 41 of the members 21, 22. The drive shaft 44 is connected to the central hub portion 24 of the disk 23 by means of an attachment plate 46 which is secured to the central hub portion 24 of the disk 23 by conventional fastening elements 47. The shaft 44 passes through a drive bearing assembly mounted about an aperture in the bottom 17 of the tank 16 to prevent the escape of liquid contained therein. The shaft 44 extends out of the bottom of the bearing assembly 48 and is attached to a drive pulley 49 which can be positively driven by a drive motor 15 external to the tank 16 via drive belt 50 as conventionally known.

FIG. 2 also discloses, as a possible additional feature, a fluid level control device 51 which includes a hypodermic-type cylindrical body 52 having an outlet 53 coupled by means of a tubing 54 or the like through an opening 55 in the wall 18 of the tank 16 for communicating with the interior of the tank 16. The level adjustment device 51 includes a manually operable plunger 56 for selectively drawing the liquid 10 from the tank 16 into the hollow body 52 via the tube 54 or for expelling liquid from the body 52 into the tank 16 so as to selectively increase or decrease the level of liquid 10 within the tank 16 thereby increasing or decreasing the height or position of the upper member 22 within the tank 16 so as to compensate for variations in the thickness of the records 38 carried by the turntable platter 37 of the upper member 22. The control device 51 may also be used to provide a means for fine tuning or making small adjustments in the rotational speed of the member 22. Alternatively, the spindle assembly 39 may be modified to provide such compensation as hereinafter described.

FIG. 3 shows one embodiment of the upper symmetrical member 22 and the lower symmetrical member 21 of the present invention. In the embodiment of FIG. 3, the annular rim portions 26, 33 are cylindrical hoop-like rings. The lower edge 57 of the rim portion 26 of the lower symmetrical element 21 is integral with or secured to the upper surface 29 of the disk 23 adjacent the outer peripheral portion 25 thereof. The distal edge 58 of the disk 23 is flush with and parallel to the radially outer surface 59 of the rim portion 26 and is coplanar therewith. Similarly, the rim portion 33 of the upper symmetrical member 22 has its upper edge portion 60 integral with or secured to the inside or lower surface 71 of the disk 30 adjacent the radially outer periphery 32 thereof such that the radially outer edge 61 of the disk 30 is parallel to and coplanar with the radially outer surface 62 of the rim portion 33.

FIG. 3 also shows a modified spindle assembly 39 which is capable of compensating for variations in the thickness of the phonograph records 38. The spindle assembly 39 of FIGS. 3 and 4 shows an elongated spindle body 63 having a hollow central passage 64 extending longitudinally therethrough and coincident with the rotational axis 41 of the disks 23, 30. The passage 64 has an upper opening or aperture 65 surrounded by an internal sealing ring 66. The lower end of the passage is partially sealed by a ring member 67 having a central outlet or aperture 68 therethrough. The aperture 68 communicates with an extension of the passage 64 which communicates directly with the gap 42 or via a lateral air conduit 69 with an air cushion 70 which may be trapped between the upper surface of the liquid within the tank 16 and the lower surface 71 of the underside of the disk 30.

Housed within the passage 64 is a spring 71 having its lower end disposed upon the upper surface of the sealing ring member 67 and its upper end being operable to position a ball element 72 within the opening 65. In normal operation, the spring 71 positions the ball 72 within the opening 65 so that the opening 65 is closed to the passage of air therethrough. The ball 72 may be manually depressed downward to open the passage 64 at opening 65 and allow a portion of the quantity of the trapped air 70 to escape or be bled off via conduit 69 and the passage 64. By selectively bleeding off the cushion of air 70, the heighth of the upper symmetrical element 22 with respect to the tank 16 and/or frame 12 can be selectively adjusted to compensate for variations in the thickness of the phonograph records 38.

Alternatively, a conventional spindle assembly 39 could be used in place of the modified version of FIGS. 3 and 4. The base portion 73 of the spindle device 39 is adapted to be received, such as in a snug fit manner, within a circular aperture 74 formed within the central hub portion 31 of the disk 30 so that the spindle device 39 may be selectively inserted or removed, as desired.

FIG. 5 shows one embodiment of the upper and lower circular members 22, 23 and illustrates the configuration of vanes 34, 37 thereof. In the embodiment of FIG. 5, the individual blade elements 28 comprising the vanes 27 of the lower symmetrical member 21 have an outer peripheral edge portion 106 secured to or integral with the radially inner surface 75 of the annular rim portion 75 and the radially inner edge portion 107 terminating adjacent to the central hub portion 24. Similarly, the individual blade elements 35 comprising the vanes 34 of the upper symmetrical member 22 have their outer edge portions 108 secured to or integral with the radially inner surface 76 of the annular rim portion 33 and the opposite end 109 terminating adjacent to the central hub portion 31.

An alternate embodiment of the vane configuration 34 of the upper symmetrical member 22 is shown in FIG. 6 wherein the annular collar 40 at the central hub portion 31 of the disk 30 is provided with a plurality of axially oriented slots 77. Each of the slots 77 is adapted to receivably retain the radially inner edge 78 of a vane element 35. The vane elements 35 are equally spaced circumferentially about the lower surface 71 of the disk 30 such that their longitudinal axes are radially oriented with respect to the axis of rotation 41 of the disk 30 and the radially outer edge 79 of each of the vane elements 35 is attached to or fitted snugly against the radially interior surface 76 of the annular rim portion 33.

It will, of course, be understood that the particular size, number and angularity of the vanes 27, 34 of the first and second members 21, 22 may be varied, if desired, to meet the needs of a particular application. For example, the individual blades 28, 35 may be nonplanar and could be tilted, if desired, to achieve torque multiplication or the like. Similarly, the orientation of the blades 28, 35 upon the disks 23, 30 can be varied and the blades 28, 35 can be of different sizes so long as the vanes 27 of the driven member 21 are able to set the liquid 10 in motion and caused it to rotatively circulate within the tank 16 so that it is able to exert force upon the vanes 34 of the second member 22 to drive the record 38 carried thereby.

In the preferred embodiment of the present invention, the first and second circular members 21 and 22 are integrally formed instructions such as may be produced by molding acrylic sheet material such as plexiglass. The frame 12 may be made of any suitable material, plastic or metal, but in the preferred embodiment, some type of wear-resistant, light-weight material such as stainless steel is used. Furthermore, in the preferred embodiment of the present invention 24, vane elements 25 are equally spaced at 15° intervals about the lower surface 71 of the disk 30 but any suitable shape, size and number of vanes may be employed.

In the present invention, the liquid 10 can be any suitable liquid. In the preferred embodiment a mixture of 50 percent silicone oil and 50 percent water was utilized since this mixture appears to greatly reduce vibration while providing for self-lubrication. Water could also be used by itself but the lubrication properties of the liquid 10 would be reduced. Similarly, the liquid 10 could be comprised entirely of oil but cost considerations would become a factor. In the present system, approximately 2 gallons of oil-water mixture weighing about 8 pounds per gallon was used to provide approximately a 16-pound fly wheel for speed control purposes. In the preferred embodiment, the silicone oil utilized was purchased commercially as Dow-Corning 200 silicone oil.

In operation, the motor 78 of the external drive assembly 15 is used to positively rotate or drive the shaft 44. The shaft 44 passes through the bottom 17 of the tank 16 by means of the drive bearing assembly 48 so that the shaft 44 may be rotated without the loss of liquid 10 from the tank 16. The positive rotation of the shaft 44 causes the positive rotation of the first circular member 21 via the shaft coupling plate 46 which secures the shaft 44 to the interior hub portion 24 of the disk 23 of the first member 21. The positive rotation of the first circular member 21 causes the liquid 10 to rotatively circulate within the tank 16 since the vanes 27 impart a force to the liquid 10 tending to circulate or rotate it within the walls 18 of the tank 16.

The liquid 10 acts as a true fluid coupling between the first circular member 21 and the second circular member 22 and functions both to support the second circular member 22 vertically within the tank 16 and to transmit the force of the circulating liquid 10 to the vanes 34 of the second circular member 22 causing it to rotate as well. When a liquid is in motion so that no layer moves relative to an adjacent layer, there will be no shear forces set up regardless of the viscosity of the liquid. The absence of shear forces will insure a vibration free coupling. The boyant force exerted on a body by a static liquid in which it is submerged or floated acts vertically upward. There can be no horizontal component of the resultant force because the vertical projection of this submerged body or submerged portion of the second member 22 is always zero. This provides for ideal vertical stability.

The fluid coupling provided by the liquid 10 truly isolates the second member 22 from the drive member 21 and eliminates or at least substantially reduces the effects of mechanical vibration produced within the bearing assembly 48 and drive means 15. Another major source of error is eliminated by the use of the liquid 10 since the circulating liquid 10 forms a significant fly wheel when taken in conjunction with members 21, 22. Any minor fluctuation in drive speed due to variations in line current, motor malfunctions and the like are eliminated or at least substantially damped out by the fly wheel effect so that flutter is eliminated or reduced. Therefore, the turntable apparatus of the present invention eliminates or substantially reduces the problems inherent in the turntable apparatus of the prior art and represents a significant advance thereover.

FIG. 7 illustrates the preferred embodiment of the upper symmetrical member 22 of the present invention. In the embodiment of FIG. 7, the upper symmetrical member 22 includes a generally flat circular disk 30 having a central hub portion 31 and an outer peripheral portion 32. A central annular collar portion 80 extends vertically upward from the upper surface 36 of the disk 30 about the central hub portion 31 and is concentric to the axis of rotation of the second member 22. The annular collar 80 has a cylindrical central aperture 81 which is adapted to receivably house the base portion 82 of a spindle assembly 83 therein. The spindle assembly 83 positions a vertically oriented spindle 85 aligned with the axis of rotation 41 and the upper vertical surface 86 of the collar 80 together with the vertical upper surface 87 of the spindle assembly 83 serve to support the central portion of a phonograph record 38 when it is disposed with the spindle 85 through the control aperture of the record 38.

The outer peripheral portion 32 of the disk 30 includes an upwardly extending rim portion 88 integral with the outer peripheral portion 32 of the disk 30. The rim portion 88 extends about the periphery of the disk 30 so as to form a cylindrical wall rising vertically upward from the disk 30 and perpendicular to the plane thereof. In the preferred embodiment of FIG. 7, the rim portion 88 includes a generally L-shaped configuration wherein one leg 89 forms the vertically extending cylindrical wall about the outer periphery of the disk 30 and the other leg 90 extends radially outward from the leg 89 and is generally parallel to the plane of the disk 30. A notch 91 is provided in the byte of the L-shaped rim portion 88 between the outer wall of the leg 89 and the underside of the leg 90 to provide a spacing or gap 43 between the inner surface 92 of the wall 18 of the tank 16. In the preferred embodiment, the liquid 10 within the tank 16 flows up into the gap 43 and the clearance provided between the rim portion 88 and the inner surface 92 of the wall 18 of the tank 16 together with the notched portion 91 provides a fluid bearing which causes the upper circular member 22 to automatically self-center itself when it is operatively rotated by the circulating liquid 10 within the tank 16.

A second gap or space 93 is provided between the vertically lower surface of the leg 90 of the rim portion 88 and the vertically upper surface of the wall 18 of the tank 16 so that the upper circular member 22 can be vertically raised or lowered within the tank 16 to compensate for variations in the thickness of the phonograph records 38.

The vanes 34 of the member 22 may be, for example, a plurality of generally flat rectangular blade elements 35 which are radially aligned about the axis 41 of the member 22 and spaced equally about the circumference of the lower surface 71 of the disk 30. The upper edge of each of the blades 35 is disposed adjacent the surface 71 and it has been found that very small blades may be used with the embodiment of FIG. 7.

The radially outer surface 94 of the annular colar 80, the upper surface 36 of the disk 30 and the radially inner surface 95 of the rim portion 88 defines an annular recess or depression 96 below the level upon which the phonograph record 38 is supported. As mentioned previously, the inner portion of the record 38, or actually of the support member 37 which supports the record 38, is disposed upon the surfaces 86 and 87 of the annular collar 80 and the spindle assembly 83. The outer peripheral edge of the record 38 or record support 37 is disposed upon the upper surface 97 of the second leg 90 of the annular rim 88 so that the portion between the rim 88 and the annular collar 80 is generally hollow.

In the preferred embodiment of FIG. 7, the annular depression 96 may serve two purposes. Firstly, the surface 36 of the disk 30 adjacent the outer peripheral portion 32 but within the depression area 96 may be provided with an annular groove 97. The groove 97 is adapted to receivably retain a ring member 98 which may serve as a counter weight to increase the mass of the member 22 and aid in achieving a greater fly wheel effect. Additionally, the use of the counter weights 98 avoids top heaviness and renders the upper member 22 much more stable. Secondly, the interior of the depression or cavity 96 may be filled with a sound absorbing foam 99 which serves to further isolate the phonograph record 38 from mechanical vibration, rumble and noise. The accoustical foam 99 may, for example, be any suitable commercially available brand such as Scott brand Feltfoam.

FIG. 8 represents another embodiment of the upper circular member 22 and corresponding elements are designated by corresponding reference numerals. The upper circular member 22 of FIG. 8 includes a generally circular substantially flat disk 30 having a central hub portion 31 and an outer peripheral portion 32. The central hub portion 31 includes an aperture 100 coincident with the axis of rotation 41 of the member 22 which is adapted to receive a spindle assembly 83 as previously described. Furthermore, the outer peripheral portion 32 of the disk 30 includes a downwardly extending annular rim portion 101 about the circumference of the lower surface 71 of the disk 30. The rim portion 101 is generally disposed in a vertical downward direction perpendicular to the plane of the disk 30 and it is disposed a predetermined distance from the outer peripheral edge 102 of the disk so that an L-shaped byte is formed between the radially outer surface 103 of the rim 101 and the lower surface of the outer edge 102 of the disk 30. The L-shaped byte portion is provided with a notch 91.

As previously described, the liquid 10 from the tank 16 will rise into the gap 43 between the radially inner surface 92 of the wall 18 of the tank 16 and the radially outer surface 103 of the rim 101 and either the liquid 10 and/or the air trapped thereabove will flow into the notch portion 71 to provide a fluid bearing therebetween to allow self-centering of the member 22 as it is operatively rotated. Similarly also, a gap 93 is provided between the vertically lower surface of the peripheral edge 102 of the disk 30 and the upper surface of the wall 18 to allow the circular member 22 to be selectively vertically positioned within the tank 16 to compensate for variations in record thickness. The upper surface 71 of the disk 30 is provided with a plurality of blade elements 35 which extend from adjacent the rim portion 101 to the hub portion 31 of the disk 30 and which are radially disposed about the circumference of the lower surface 71 of the disk 30.

FIG. 9 represents still another embodiment of the upper circular member 22 of the present invention and similar elements receive corresponding reference numerals. In the embodiment of FIG. 9, the fluid bearing is produced between the inner surface 92 of the wall 18 of the tank 16 and the outer surface 103 of the rim portion 101 of the disk 30 but the notch 91 which increases the efficiency of the fluid bearing is omitted. Similarly, the space 93 between the lower surface of the outer edge 102 of the disk 30 and the upper surface of the edge or wall 18 of the tank 16 provides a space to allow the circular member 22 to be selectively raised and lowered within the tank 16 in order to compensate for variations in the thickness of the phonograph records 38.

The method of the present invention provides a means for rotatively supporting phonograph records, memory disks and the like so as to minimize if not totally eliminate the effects of mechanical vibrations and speed fluctuations. The method contemplates providing a generally cylindrical tank 16 and mounting a first circular member 21 having a plurality of spaced vanes 27 adjacent the bottom 17 of the tank 16 such that the vanes 27 are disposed upwardly therefrom. The tank 16 is filled with sufficient liquid 79 to more than cover the vanes 27 of the first member 21 and a second circular member 22 having a plurality of spaced vanes 34 thereon is located vertically above the first member 21 so that the vanes 34 of the second member 22 are disposed downwardly toward the vanes 27 of the first member 21 but are spaced vertically therefrom. There is no mechanical interconnection or bearing linking the second circular member 22 with the first circular member 21 or with the tank 16 or frame 12. The downwardly disposed vanes 34 extend at least partially into the quantity of liquid 10 and the first and second members 21, 22 are positioned so that each is free to rotate with respect to the other.

The phonograph record, memory disk or the like 38 is supported upon the upper surface 36 of the second member 22, for example, by a turntable support platter 37, for rotation with the member second 22. The first member 21 is rotatively driven by a motor 78 external to the tank 16 and the vanes 27 cause the liquid 10 within the tank 16 to rotatively circulate therein. The force circulating liquid 10 within the tank 16 is then utilized to rotate as well as support the second member 22 while simultaneously serving to isolate the second member 22 from sources of mechanical vibration and speed fluctuation. The total free float aspect of the present invention provides the highest degree of isolation yet achieved in the art and provides the best possible means for attaining true and accurate sound reproduction.

With this detailed description of the specific apparatus used to illustrate the method and apparatus of the present invention and the operation thereof, it will be obvious to those skilled in the art that various modifications can be made without departing from the spirit and scope of the invention which is limited only by the appended claims.

I claim:

1. A turntable assembly for rotatively supporting phonograph records, memory disks and the like comprising:

tank means for receivably containing a quantity of liquid therein;

a first symmetrical member having an axis of rotation and a plurality of generally radially disposed vanes extending generally upwardly therefrom;

a second symmetrical member having an axis of rotation and plurality of generally radially disposed vanes extending generally downward therefrom, said first member and at least a portion of said second member being disposed within said tank means such that the vanes of said first member and at least a portion of the vanes of said second member are immersed in said quantity of liquid contained within said tank means, said second symmetrical member being supportively positioned above said first symmetrical member and spaced apart therefrom by the bouyant force of said liquid without any mechanical connections therebetween so as to establish a fluid coupling therebetween and a fluid bearing between the walls of said tank means and the radially outer portion of said second member such that the axes of rotation are coincident during rotational operation thereof, the plane of said second member being generally parallel to the plane of said first member and both of said planes being generally horizontal such that the vanes of said first member are disposed generally toward the vanes of said second member, and such that either of said members is free to rotate with respect to the other about said coincident axes;

a turntable platter means carried by the upper surface of said second member for rotation therewith, said platter means being adapted for supportively carrying said phonograph records, memory disks and the like; and means for rotatively driving said first member such that the rotation thereof causes said quantity of liquid to rotatively circulate within said tank means for drivably rotating said second member via said fluid coupling established therebetween while effectively isolating said turntable platter means from the effects of mechanical vibration and speed fluctuations.

2. The turntable assembly of claim 1 wherein each of said symmetrical members includes a generally circular disk having a central hub portion and wherein said plurality of vanes includes a plurality of circumferentially spaced, radially oriented, vertically disposed blade elements positioned about said central hub portion.

3. The turntable assembly of claim 2 wherein the generally circular disk of said first lower symmetrical member includes a vertically disposed upwardly facing annular rim about the periphery thereof and the generally circular disk of said upper second symmetrical member includes a vertically disposed downwardly facing annular rim about the periphery thereof, said annular rim portion serving to form a fluid bearing between the radially outer surface thereof and the sides of said tank means for automatically centering said second, bouyantly floated upper symmetrical member during rotational operation.

4. The turntable assembly of claim 2 wherein each of the plurality of blades is a substantially flat rectangular element having its longitudinal axis aligned radially about said disk and having one lateral edge disposed adjacent the outer periphery of said disk and its opposite lateral edge disposed radially inward toward said hub portion, the lateral axis of said blade being generally perpendicular to the plane of said disk.

5. The turntable assembly of claim 1 wherein said first and second symmetrical members are substantially identical and each includes a generally circular substantially flat disk, a rim portion integral with said disk and disposed adjacent to the radially outer periphery thereof, said rim portion being generally perpendicular to the plane of said disk, the combination of said disk and said rim portion forming a generally dish-shaped configuration, each of said first and second symmetrical elements further including a plurality of generally flat substantially identical blade elements disposed about said disk, the longitudinal axis of said blade elements being disposed radially with respect to said disk and the lateral axis of said blade elements being disposed perpendicularly to the plane of said disk in the direction of disposition of said rim portion.

6. The turntable assembly of claim 5 wherein each of said plurality of blade elements has one edge portion disposed adjacent the outer periphery of said disk and its opposite edge portion extending toward the axis of rotation thereof.

7. The turntable assembly of claim 5 wherein each of the blade elements has one edge portion disposed adjacent a central hub portion of said disk and its opposite edge portion extending outwardly therefrom.

8. The turntable assembly of claim 1 wherein said second symmetrical member includes a generally circular substantially flat disk, the upper surface of said disk is adapted to carry said turntable platter means and the central hub portion of said disk being adapted to carry a spindle means for centering said phonograph record on said turntable platter, wherein said disk includes a concentric rim portion integral with the lower surface of said disk and extending downwardly therefrom in a direction perpendicular to the plane of said disk, said rim portion being disposed a predetermined distance radially in from the outer periphery of said disk for providing a fluid bearing between the sides of said tank means, the undersurface of that portion of said disk which extends radially outward of said rim portion and the radially outward surface of said rim portion for automatically self-centering said second member upon operational rotation thereof.

9. The turntable assembly of claim 8 wherein a cushion of air is trapped between the under surface of said disk and the upper surface of said liquid contained within said tank means and wherein said spindle means includes a central air conduit communicating with said cushion of air and manually adjustable valve means disposed within said conduit for selectively bleeding off a portion of said air cushion to raise or lower said second member with respect to said tank means to compensate for record thickness variations.

10. The turntable assembly of claim 1 wherein said second symmetrical member includes a generally circular substantially flat disk having a central hub portion about the axis of rotation thereof, the upper surface of said disk being adapted to carry said turntable platter and the central hub portion thereof being adapted to carry a spindle means for centering a phonograph record carried by said turntable platter, the lower surface of said disk including an integrally formed downwardly extending rim portion disposed concentrically about the axis of said disk, said rim portion being disposed perpendicular to the under surface of said disk and being spaced a predetermined distance from the outer peripheral edge thereof so as to form a V-shaped notch between the under surface of the outer peripheral edge portion of said disk and the radially outer surface of said rim portion to provide a highly efficient fluid bearing between the outer peripheral edge of said disk, the radially outer surface of said rim portion, and the side and top surface of the walls of said tank means to allow said second symmetrical member to be automatically centered within said tank means when said liquid contained therein is operatively driven by said first symmetrical member.

11. The turntable assembly of claim 10 wherein said second symmetrical member, said tank means, and a level of liquid contained therein are adapted for trapping a cushion of air between the under surface of said disk and the upper surface of said liquid and wherein said spindle means includes an air-conducting conduit communicating with said air space and a manually operable valve means disposed within said air conduit for bleeding off the air trapped between said disk and said liquid to selectively adjust the vertical position of said disk to compensate for record thickness variations, the outer periphery of said disk and the upper edge of the tank wall being adapted to provide a gap therebetween to accommodate said vertical disk positioning.

12. The turntable assembly of claim 1 wherein said second symmetrical member includes a generally circular substantially flat disk having a central hub portion disposed vertically above and generally perpendicular to the upper surface of said disk, said central hub portion being adapted to carry a spindle means for centering phonograph records carried by said turntable platter, said disk further including an annular rim portion disposed concentrically about said central hub portion and being disposed upwardly from the upper surface of said disk and perpendicular thereto, the radially outer surface of said hub portion, the upper surface of said disk, and the radially inner surface of said edge of said rim portion forming an annular depression about said hub portion thereby giving said second symmetrical member a generally dish-shaped configuration, said plurality of radially disposed vanes being positioned circumferencially about the lower surface of said disk.

13. The turntable assembly of claim 12 wherein said rim portion is a generally L-shaped member having one portion disposed upwardly from and generally perpendicular to the upper surface of said disk and the other portion disposed radially outwardly therefrom and being disposed substantially parallel to the plane of said disk, the bight portion of said L-shaped rim portion being provided with a V-shaped notch so as to provide an efficient fluid bearing between the top and side walls of said tank means and said L-shaped rim portion for automatically centering said second symmetrical member when it is operatively rotated, the upper surface of said other portion of said L-shaped rim portion and the upper surface of said spindle means carried by said central hub portion serving as said upper surface of said second member for operatively carrying said turntable platter means thereon.

14. The turntable assembly of claim 12 wherein the upper surface of said disk inwardly adjacent from said rim portion and within said annular depression includes a concentric groove and said assembly further includes a ring-like mass having one portion adapted to be positionably received within said groove and the other portion being disposed within said annular depression for counter-weighing said second symmetrical member to increase the mass and stability thereof.

15. The turntable assembly of claim 14 wherein said annular depression is filled with a sound-absorbing foam means for further isolating said turntable means for mechanical vibrations, noise and rumble.

16. The turntable assembly of claim 12 wherein said annular depression contains a predetermined quantity of acoustical foam.

17. The turntable assembly of claim 12 further including means for selectively varying the quantity of air trapped between the lower surface of said disk and the upper surface of said liquid contained within said tank means to compensate for record thickness and the like.

18. The turntable assembly of claim 1 further including means for counter weighting said second symmetrical member to increase the stability and operational characteristics of the assembly.

19. The turntable assembly of claim 1 further including means for selectively varying the quantity of air trapped between the lower surface of said second symmetrical member and the upper surface of the quantity contained within said tank means to selectively compensate for record thickness and the like.

20. A method of rotatively supporting phonograph records so as to minimize the effects of mechanical vibrations and speed fluctuations comprising the steps of:
providing a generally cylindrical tank;
mounting a first circular member having a plurality of spaced vanes thereon adjacent the bottom of said tank such that said vanes are disposed upwardly therefrom;
filling said tank with sufficient liquid to more than cover the vanes of said first member;
positioning a second circular member having a plurality of spaced vanes thereon vertically above said first member such that the vanes of said second member are disposed downwardly toward the vanes of said first member but are spaced vertically therefrom and such that the downwardly disposed vanes of said second member extend at least partially into said liquid, said first and second members being positioned such that each is free to rotate with respect to the other and such that no direct mechanical interconnection exists therebetween;
supporting said phonograph record upon an upper surface of said second member for rotation therewith;
rotatably driving said first member so as to rotatively circulate said liquid in said tank; and
utilizing the force of the circulating liquid to rotate as well as support said second member while mechanically isolating said second member from said first member to substantially reduce the effects of mechanical vibration and drive speed fluctuations.

21. A fludically driven turntable assembly comprising:
a tank;
a generally symmetrical member disposed at least partially within said tank for rotation therein in a generally horizontal plane, the lower side of said member having a plurality of spaced vane elements thereon, the periphery of said member being adapted to form a fluid bearing between the walls of said tank and said member for automatically centering said generally symmetrical member during the operational rotation thereof, and the upper side of said member being adapted to supportively carry phonograph records and the like for rotation therewith;
liquid means disposed within said tank in sufficient quantity to at least partially immerse the vanes of said member, said liquid means being operative to bouyantly support said member within said tank without mechanically connecting said member to any external drive means; and
means for positively rotatably circulating said liquid means for rotatably driving said fluidically coupled, generally symmetrical member and the phonograph record supportively carried thereby while simultaneously isolating said phonograph record from mechanical vibrations normally inherent in the means for positively rotatably circulating said liquid.

22. The fluidically driven turntable assembly of claim 21 further including means adapted to be carried by a surface of the said symmetrical member for selectively increasing or decreasing the mass thereof to increase the stability thereof.

23. The fluidically driven turntable assembly of claim 21 further including means for selectively increasing or decreasing said quantity of liquid or the air trapped thereabove to compensate for variations in record thickness.

24. The fluidically driven turntable assembly of claim 21 wherein said generally symmetrical member includes a generally flat circular disk having an axis of rotation and a rim portion disposed away from one surface of said disk and perpendicular thereto, said rim portion being adapted to provide a fluid bearing between a surface thereof and the surface of said tank for automatically centering said member when it is operatively rotated without requiring the symmetrical member to be mechanically interconnected to anything else.

25. A turntable assembly comprising tank means for receivably housing a quantity of liquid, means for rotatively circulating said liquid within said tank means, a generally circular member floated centrally within said tank means upon said liquid, said member having configurations operatively disposed on the liquid contacting bottom thereof for receiving the force of the circulating liquid and imparting rotation to said member, the upper portion of said member being adapted to rotatively carry a phonograph record.

26. The turntable assembly of claim 25 wherein said member includes a raised hub portion and a raised annular rim for forming an annular depression about said hub portion.

27. The turntable assembly of claim 26 further including mass-increasing counter weights and said annular depression includes means for retainably receiving said weights for increasing the mass and stability of said member.

28. The turntable assembly of claim 26 further including sound-absorbing foam adapted to be received in said annular depression for further isolating said phonograph record from mechanical vibrations.

29. The turntable assembly of claim 25 wherein said generally circular member includes means for forming a fluid bearing for automatically centering said member within said tank means as it is operatively rotated by said liquid.

30. The turntable assembly of claim 25 further including means for selectively adjusting the vertical position of said member within said tank to compensate for variations in phonograph record thickness and to effect some measure of speed control.

* * * * *